US00RE35783E

United States Patent [19]

Leonhartsberger et al.

[11] E Patent Number: Re. 35,783

[45] Reissued Date of Patent: May 5, 1998

[54] INJECTION MOLDING MACHINE HAVING TILTABLE MOUNTING PLATES

[75] Inventors: Heinz Leonhartsberger, Schwertberg; Helmut Naderhirn, Perg; Werner Kappelmüller, Schwertberg; Otto Urbanek, Linz, all of Austria

[73] Assignee: Engel Maschinenbau Gesellschaft m.b.H., Schwertberg, Austria

[21] Appl. No.: 706,446

[22] Filed: Aug. 30, 1996

Related U.S. Patent Documents

Reissue of:

[64] Patent No.: 5,249,951
Issued: Oct. 5, 1993
Appl. No.: 782,572
Filed: Oct. 25, 1991

U.S. Applications:

[63] Continuation of Ser. No. 394,656, Feb. 22, 1995, abandoned.

[51] Int. Cl.[6] ..... B29C 45/64

[52] U.S. Cl. ..... 425/589; 100/258 A; 425/451; 425/451.9

[58] Field of Search ..... 425/589, 593, 425/150, 409, 450.1, 451, 451.2, 451.5, 451.9, 590, 592, 595; 100/258 A

[56] References Cited

U.S. PATENT DOCUMENTS

| | | | |
|---|---|---|---|
| Re. 30,130 | 10/1979 | Edwards | 425/453 |
| 1,476,765 | 12/1923 | Murray, Jr. et al. | 425/590 |
| 3,981,671 | 9/1976 | Edwards | 425/453 |
| 4,007,679 | 2/1977 | Edwards | 100/53 |
| 5,354,196 | 10/1994 | Zivan | 425/589 |

FOREIGN PATENT DOCUMENTS

| | | |
|---|---|---|
| 0095008 | 5/1982 | European Pat. Off. . |
| 0088100 | 8/1983 | European Pat. Off. . |
| 0311133 | 10/1988 | European Pat. Off. . |
| 1142231 | 7/1963 | Germany . |
| 1206571 | 12/1965 | Germany . |
| 6603197 | 12/1967 | Germany . |
| 1915394 | 3/1969 | Germany . |
| 1931432 | 6/1969 | Germany . |
| 2048258 | 2/1976 | Germany . |
| 2441805 | 3/1976 | Germany . |
| 8032704 | 12/1980 | Germany . |
| 3132949 | 3/1983 | Germany . |
| 2321694 | 8/1983 | Germany . |
| 3722340 | 7/1987 | Germany . |

OTHER PUBLICATIONS

The ENGEL brochure Aug. 1982.

*Primary Examiner*—Tim Heitbrink
*Attorney, Agent, or Firm*—Notaro & Michalos PC

[57] ABSTRACT

In an injection molding machine having a machine frame, a stationary mold mounting plate, a movable mold mounting plate and a support portion on the machine frame, which carries a mold closing mechanism, the support portion and the stationary mold mounting plate are connected exclusively by way of the machine frame. The closing force which occurs during the closing phase and the expansion force which occurs during injection, as between the support portion and the stationary mold mounting plate, are carried only by way of the machine frame. The mold mounting plates are mounted tiltably about a respective horizontal axis while a guide means is provided between the two mold mounting plates or the movable mold mounting plate and the machine frame.

13 Claims, 5 Drawing Sheets

INJECTION MOLDING MACHINE HAVING TILTABLE MOUNTING PLATES

Matter enclosed in heavy brackets [ ] appears in the original patent but forms no part of this reissue specification; matter printed in italics indicates the additions made by reissue.

*CROSS-REFERENCE TO RELATED APPLICATIONS*

*This is a continuation of application Ser. No. 08/394,656, filed Feb. 22, 1995, now abandoned, which was a reissue of Ser. No. 07/782,572, filed Oct. 25, 1991, and issued as U.S. Pat. No. 5,249,951 on Oct. 5, 1993.*

BACKGROUND OF THE INVENTION

The invention relates to an injection molding machine.

One form of injection molding machine, as is to be found in EU-A1-0 311 133, comprises a machine frame, a stationary mold mounting plate and a movable mold mounting plate, as well as a cylinder plate carrying a closing mechanism such as a hydraulic, electromechanical or hydraulic-mechanical mechanism. The cylinder plate against which the movable mold mounting plate is supported and the stationary mold mounting plate are connected without the intervention of struts or bars exclusively by way of the machine frame so that the closing force which occurs during the closing phase and the expansion force which occurs during the injection phase, as between the cylinder plate and the mold mounting plate, are passed only by way of the machine frame.

SUMMARY OF THE INVENTION

An object of the present invention is to provide an injection molding machine which affords a good guide action for the mold mounting plates and absolute parallelism of the two mold halves, even when very high mold expansion forces are involved.

In accordance with the present invention, the foregoing and other objects are achieved by an injection molding machine comprising a machine frame, a stationary and a movable mold mounting plate, and a cylinder plate carrying a hydraulic, electromechanical or hydraulic-mechanical closing mechanism. The cylinder plate which supports the movable mold mounting plate and the stationary mold mounting plate are connected exclusively by way of the machine frame, without the aid of connecting bars, whereby the closing force which occurs during the closing phase and the expansion force during the injection phase, as between the cylinder plate and the mold mounting plate, go only by way of the machine frame. At least one mold mounting plate is mounted tiltably about a horizontal axis, while there is further included a guide between the two mold mounting plates or the movable mold mounting plate and the machine frame.

In a preferred embodiment of the invention the two mold mounting plates are mounted tiltably about a horizontal axis while in a further preferred feature of the invention the guide means includes a guide rail which is mounted on one of the mold mounting plates, preferably the stationary mold mounting plate, with the respective other mold mounting plate being guided on the guide rail by means of at least one slide shoe.

By virtue of the fact that the guide rail is fixed to the fixed or stationary mold mounting plate, it also performs any tilting movement with that mold mounting plate. The movable mold mounting plate is in turn guided on the guide rail and is rotatably connected to the machine frame so that that configuration ensures parallel orientation of the two mold mounting plates relative to each other, even in the event of possible deformation or distortion of the machine frame.

In another preferred feature of the invention, the guide means includes a guide rail which is mounted to the machine frame and on which the movable mold mounting plate is guided by means of at least one slide shoe, while provided in the guide means is at least one spring to permit resilient tilting movement of the movable mold mounting plate. In that arrangement the spring may be disposed between the slide shoe and the movable mold mounting plate, or the rail may be mounted on the machine frame by means of one or more springs. In both configurations it is possible for the mold mounting plates to tilt relative to the machine frame and to remain parallel to each other.

Further objects, features and advantages of the invention will be apparent from the following description of preferred embodiments.

DESCRIPTION OF PREFERRED EMBODIMENTS

Figure 1:
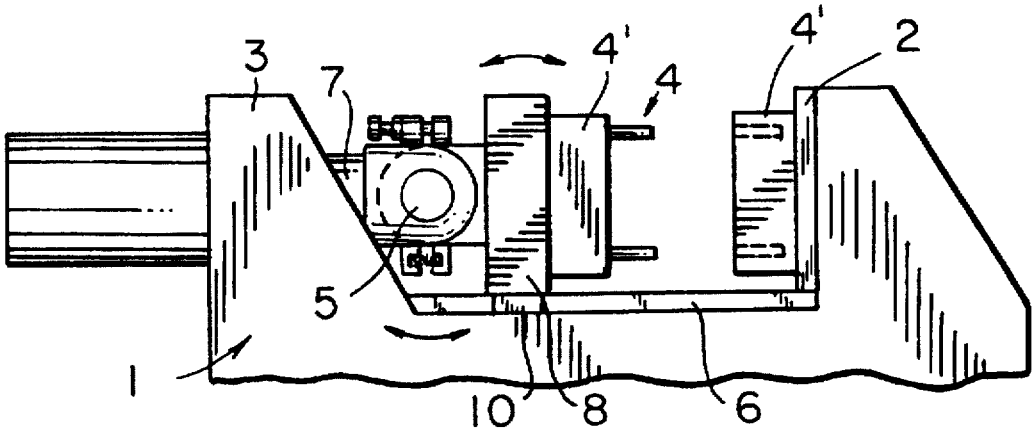
FIG. 1 is a side view of an embodiment of an injection molding machine according to the invention.
Figure 2:
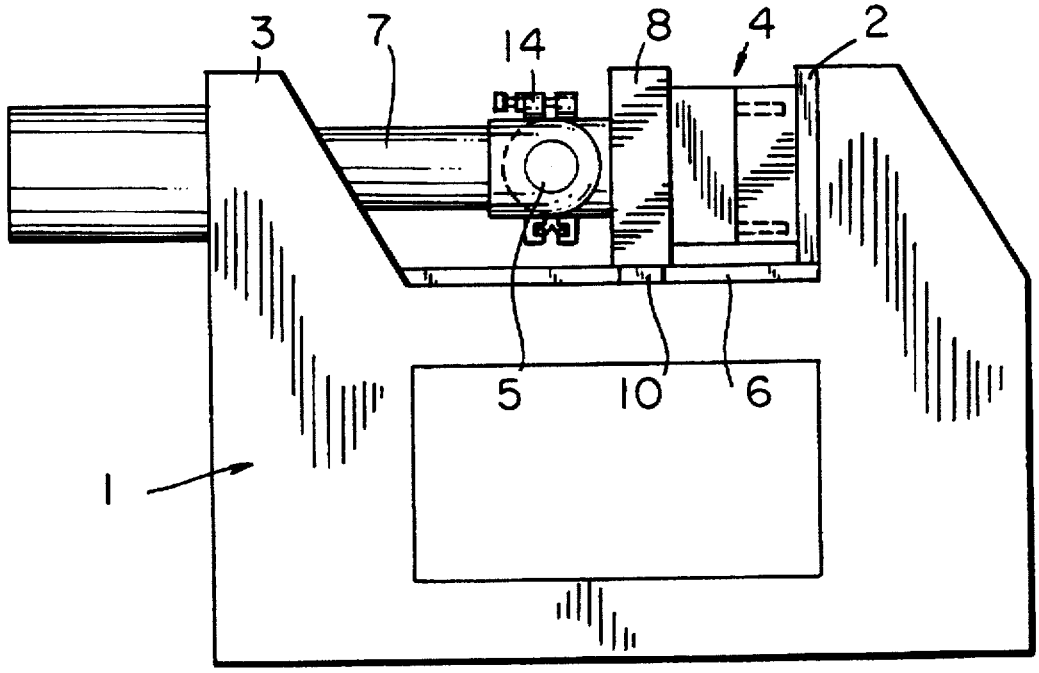
FIG. 2 is a side view of the FIG. 1 machine in a different operating position.

Referring generally to the drawings at this stage, in the embodiment shown in FIGS. 1 and 2, only the movable mold mounting plate 8 is mounted tiltably about a horizontal axis by means of a pivot joint 5. In the embodiment shown in FIGS. 3 through 5, both the movable mold mounting plate 8 and also the stationary mold mounting plate 2 are mounted tiltably about horizontal axes by means of pivot joints 5.

Looking now at FIGS. 1 and 2, a major part of the injection molding machine according to the invention is a machine frame as indicated generally at reference numeral 1, which stationarily carries a stationary mold mounting plate 2 and a cylinder plate 3 forming a support portion of the machine frame 1. The movable mold mounting plate is indicated at 8 in FIGS. 1 and 2. The machine frame 1 together with the mold mounting plates 2, 8 and the cylinder plate 3 are advantageously cast from spheroidal graphite iron.

The stationary mold mounting plate 2 and the movable mold mounting plate 8 carry the respective portions 4' of the injection molding mold 4.

An injection unit with a feed hopper which are not shown in the drawings are mounted on the stationary mold mounting plate 2 in the usual manner. The injection unit and the feed hopper are not part of the subject-matter of this invention and are designed in conventional fashion, so that they do not need to be described in detail herein.

The cylinder plate 3 carries a closing mechanism including a piston-cylinder unit 7 which in turn carries the movable mold mounting plate 8. The piston-cylinder unit 7 is thus operable to move the mold mounting plate 8 between a mold-open and a mold-closed position, and to hold the movable mold mounting plate 8 in the mold-closed condition during the injection operation, with the mold halves 4' pressed against each other.

It will be appreciated that other forms of mold closing mechanisms may be employed, for example an electromechanical or a hydraulic-mechanical assembly.

In the case of a closing unit in which the mold-closing force is transmitted without interconnecting bars or struts, exclusively by way of the machine frame structure 1, the assembly could suffer from a tendency to come open in the upper region of the molding tool.

Therefore, in accordance with the present invention, a pivot 5 is provided in relation to the cylinder or the piston of the piston-cylinder unit 7, to which the movable mold mounting plate 8 in FIGS. 1 and 2 is thus connected tiltably about an at least substantially horizontal axis. It will be noted at this point that in the embodiments shown in FIGS. 3 and 4 the stationary mold mounting plate 2 is also mounted to the machine frame 1 tiltably by means of a pivot 5.

The tiltability or the mold mounting plate 8 ensures that the movable mold mounting plate 8 can bear in parallel relationship against the stationary mold mounting plate 2, when a high closing force is involved. That effect occurs both in relation to a stationary mold mounting plate 2 which is fixedly anchored to the machine frame 1, as in the case of the construction shown in FIGS. 1 and 2, and in the case of a stationary mold mounting plate 2 which is rotatably mounted on the machine frame 1, as in the constructions shown in FIGS. 3 and 4.

Figure 4:
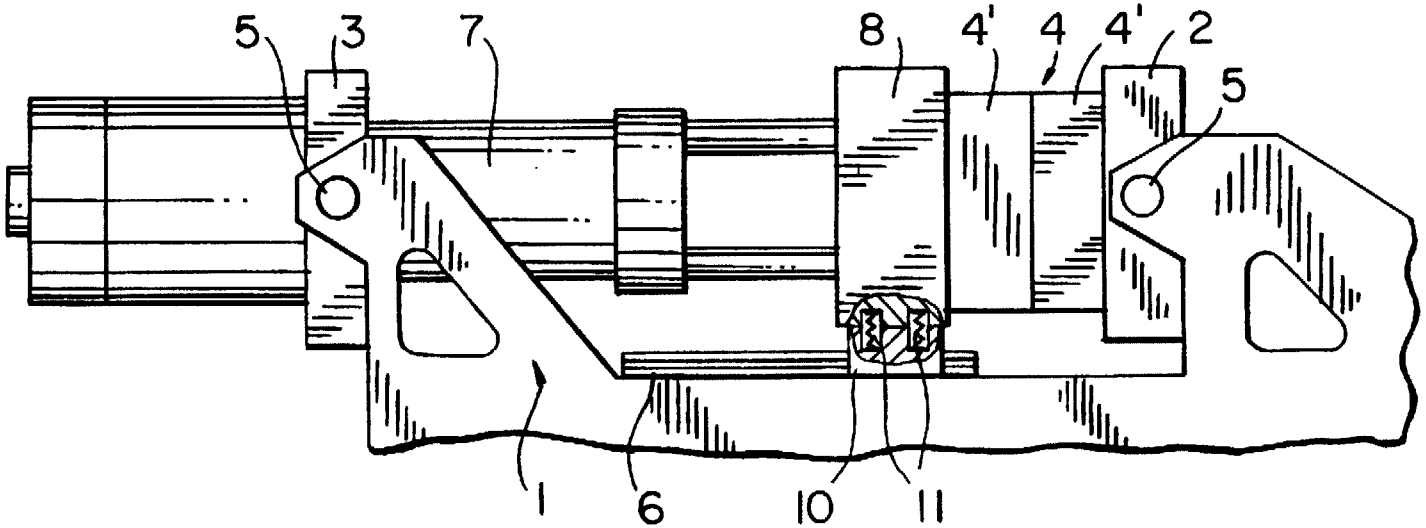
FIG. 4 is a side view or part of still another embodiment of a machine according to the invention.

Looking now at FIGS. 1, 2 and 4, in those machines a guide rail 6 is mounted to the machine frame 1, preferably being screwed thereto. The movable mold mounting plate 8 is provided with a slide shoe 10. However, the slide shoe 10 is connected to the movable mold mounting plate 8 by way of springs indicated at 11 in FIG. 4 so that, although the movable mold mounting plate 10 is guided on the guide rail 6, it is capable of tilting thereon in order to adapt to the position of the stationary mold mounting plate 2.

Figure 6:
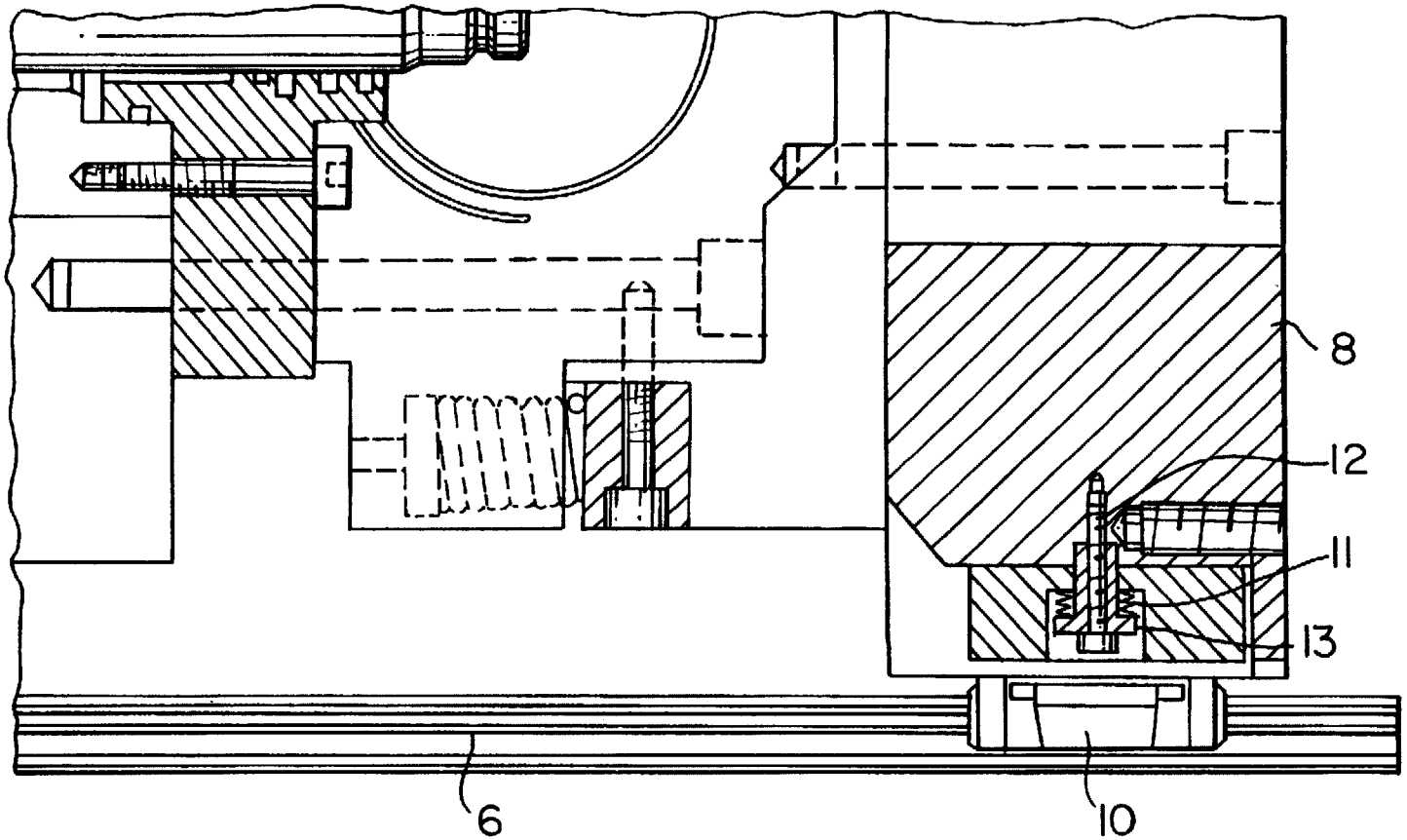
FIG. 6 is a view in vertical section through a movable mold mounting plate in the region of the sliding shoe, in a machine according to the invention.

In the illustrated embodiments, as can be seen from FIG. 6, the slide shoe 10 is secured to the movable mold mounting plate 8 by means of a pin or bolt 12 which carries a sleeve with a flange 13, against which the springs 11 bear.

Two springs or spring packs 11 are disposed in the longitudinal direction of the guide rail 6, in order to provide a good guide action for the movable mold mounting plate 8. It will be appreciated that a guide rail 6 may be disposed both at the operating side and also at the rear side of the injection molding machine or machine frame structure 1.

It should further be noted that, instead of the spring packs 11, small hydraulic cylinders may also be mounted on the mold mounting plate 8.

Figure 5:
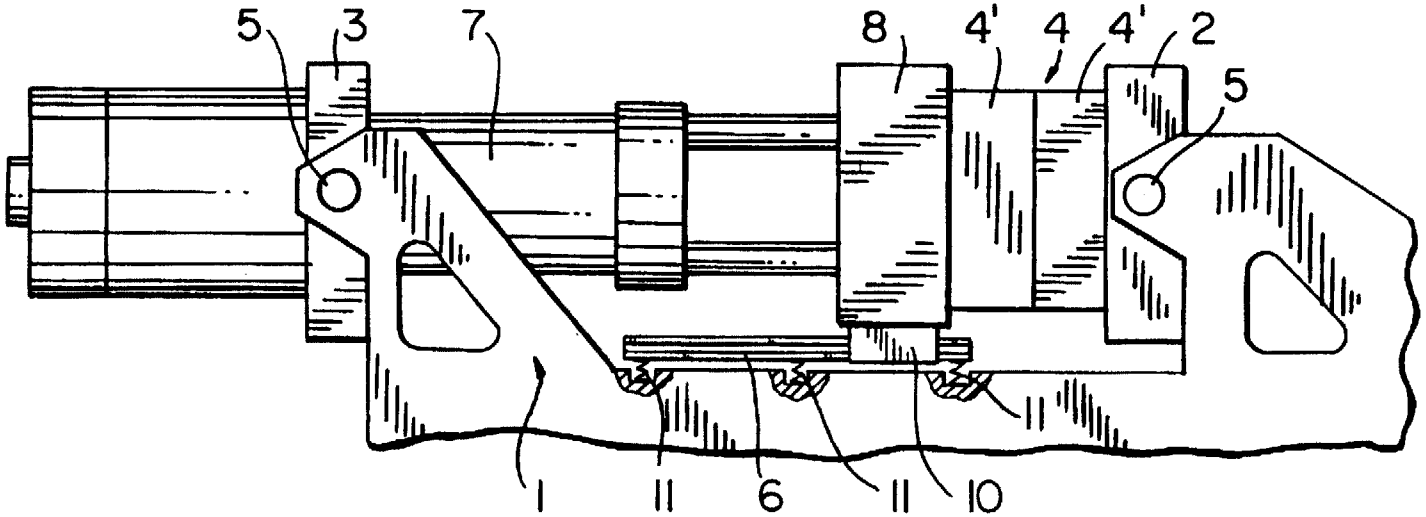
FIG. 5 is a side view of part of still a further embodiment of a machine according to the invention.

In the embodiment shown in FIG. 5, the guide rail 6 is mounted on the machine frame 1 by means of springs or spring packs 11 while the slide shoe 10 is rigidly connected to the movable mold mounting plate 8. If therefore a tilting movement of the movable mounting plate takes place, the guide rail 6 is also tilted, being capable of moving in a vertical direction relative to the machine frame 1. Once again, precise adaptation of the movable mold mounting plate 8 to the stationary mold mounting plate 2 occurs independently of any deformation or distortion of the machine frame. In this case the spring packs 11 may be replaced by hydraulic cylinders.

Figure 3:
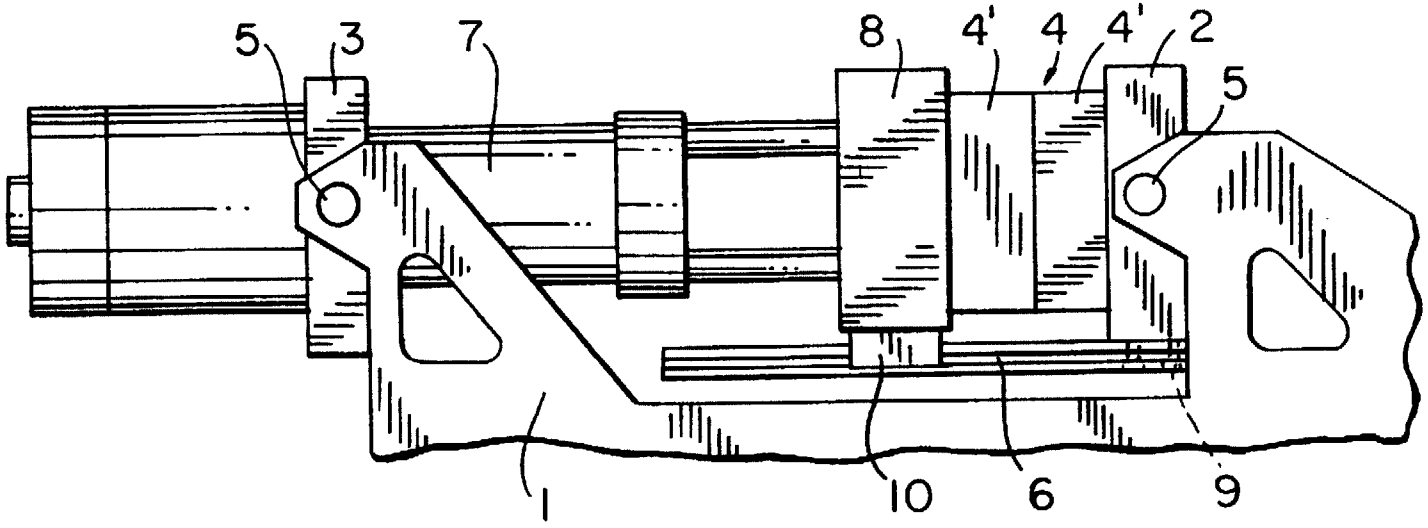
FIG. 3 is a side view of part of a further embodiment of the machine according to the invention.

In the embodiment shown in FIG. 3, a guide rail 6 is secured directly to the stationary mold mounting plate 2 by means of screws 9. The guide rail 6 therefore also performs any tilting movement with the stationary mold mounting plate 2.

The movable mold mounting plate 8 is again provided with a slide shoe 10 which positively embraces the guide rail 6 and is guided thereon in such a way as to be prevented from lifting therefrom in a vertical direction.

The fact that the movable mold mounting plate 8 is guided on the guide rail 6 ensures that the mold mounting plates 2, 8 and the mold portions 4' remain parallel to each other, even if the machine frame 1 is slightly deformed or distorted by extremely high mold expansion forces.

The configuration of the machine according to the invention means that the space between the cylinder plate 3 and the stationary mold mounting plate 2 remains free so that the mold structure 4 is easily accessible.

It will be appreciated that discharge devices and other peripheral equipment may be provided in relation to the machine according to the invention.

It will be further appreciated that the above-described embodiments of the machine according to the invention have been set forth solely by way of example and illustration of the present invention and that various modifications and alterations may be made therein without thereby departing from the spirit and scope of the invention.

What is claimed is:

1. An injection molding machine comprising a machine frame, a stationary and a movable mold mounting plate, a cylinder plate carrying a closing mechanism for exerting a closing force during a closing phase and for resisting an expansion force during an injection phase of the molding machine, wherein the cylinder plate against which the movable mold mounting plate is supported and the stationary mold mounting plate are connected without bars exclusively by way of the machine frame so that the closing force which occurs during the closing phase and the expansion force which occurs during the injection phase as between the cylinder plate and the mold mounting plate are passed only by way of the machine frame, means for mounting at least one of said mold mounting plates tiltably about a horizontal axis, and a guide between the movable mold mounting plate and the machine frame, the guide including a guide rail mounted to the machine frame and at least one slide shoe carried on the movable mold mounting plate and slidable on the guide rail, and further including in the guide at least one spring permitting resilient tilting movement of the movable mold mounting plate.

2. A machine as set forth in claim 1 wherein said spring is disposed between said slide shoe and said movable mold mounting plate.

3. A machine as set forth in claim 1 wherein said guide rail is located on the machine frame by way of at least one additional spring.

4. A machine as set forth in claim 1 wherein said spring is a plate spring.

5. A machine as set forth in claim 1 wherein said closing mechanism includes a piston-cylinder unit and further including a pivot means pivotally connecting the cylinder of said unit to the machine frame.

6. A machine as set forth in claim 1 wherein said closing mechanism is a hydraulic assembly.

7. A machine as set forth in claim 1 wherein said closing mechanism is an electromechanical assembly.

8. A machine as set forth in claim 1 wherein said closing mechanism is a hydraulic-mechanical assembly.

9. An injection molding machine comprising a machine frame, a stationary and a movable mold mounting plate, a cylinder plate carrying a closing mechanism for exerting a closing force during a closing phase and for resisting an expansion force during an injection phase of the molding machine, wherein the cylinder plate against which the movable mold mounting plate is supported and the stationary mold mounting plate are connected without bars exclusively by way of the machine frame so that the closing force which occurs during the closing phase and the expansion force which occurs during the injection phase as between the cylinder plate and the mold mounting plate are passed only by way of the machine frame, means for mounting both mold mounting plates tiltably about a horizontal axis, and a guide between the two mold mounting plates, the guide including a guide rail mounted on said stationary mold mounting plate, and at least one slide shoe carried on the movable mold mounting plate and guided on the guide rail, the slide shoe positively embracing the guide rail in such a way that lifting of the shoe from the guide rail is prevented.

*10. An injection molding machine comprising a machine frame, a stationary and a movable mold mounting plate, a*

*closing mechanism for moving the movable mold mounting plate relative to the stationary mold mounting plate, the closing mechanism and the stationary mold mounting plate being connected to each other by the machine frame, means for mounting at least one of said mold mounting plates tiltably about a horizontal axis, and guide means for guiding the movable mold mounting plate during movement of the movable mold mounting plate, said guide means including a guide rigidly mounted to one of said mold mounting plates, the other of said mold mounting plates being slidably engaged with said guide for sliding with respect to said guide during movement of the movable mold mounting plate.*

*11. The machine of claim 10, wherein said other mold mounting plate has a slide shoe, slidably guided on said guide.*

*12. The machine of claim 10, wherein said guide is a guide rail rigidly mounted to the stationary mold mounting plate.*

*13. The machine of claim 11, wherein said guide is a guide rail rigidly mounted to the stationary mold mounting plate.*

* * * * *